(12) United States Patent
Tasaka et al.

(10) Patent No.: US 12,338,590 B2
(45) Date of Patent: Jun. 24, 2025

(54) MAGNETIC MARKER, EMBEDDING JIG FOR MAGNETIC MARKER, AND EMBEDDING METHOD FOR MAGNETIC MARKER

(71) Applicant: TOYOTA JIDOSHA KABUSHIKI KAISHA, Toyota (JP)

(72) Inventors: Masahiro Tasaka, Nissin (JP); Keizo Fukushima, Nagoya (JP); Toshiyasu Takakuwa, Toyota (JP); Michiharu Yamamoto, Hekinan (JP); Tomohiko Nagao, Chita (JP); Hitoshi Aoyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 604 days.

(21) Appl. No.: 17/708,554

(22) Filed: Mar. 30, 2022

(65) Prior Publication Data

US 2022/0316159 A1 Oct. 6, 2022

(30) Foreign Application Priority Data

Apr. 5, 2021 (JP) ................................. 2021-064108

(51) Int. Cl.
| | | |
|---|---|---|
| *E01F 11/00* | (2006.01) | |
| *E01C 23/09* | (2006.01) | |
| *E01F 9/30* | (2016.01) | |
| *G01C 21/26* | (2006.01) | |

(52) U.S. Cl.
CPC .......... *E01F 11/00* (2013.01); *E01C 23/0993* (2013.01); *E01F 9/30* (2016.02); *G01C 21/26* (2013.01)

(58) Field of Classification Search
CPC ......... E01F 11/00; E01F 9/30; E01C 23/0993; G01C 21/26
See application file for complete search history.

(56) References Cited

U.S. PATENT DOCUMENTS

| | | | | |
|---|---|---|---|---|
| 1,948,335 A | * | 2/1934 | Clough | ................... E01F 9/553 404/12 |
| 4,441,288 A | | 4/1984 | Feldman et al. | |

(Continued)

FOREIGN PATENT DOCUMENTS

| | | |
|---|---|---|
| CN | 209304398 U | 8/2019 |
| CN | 111462506 A | 7/2020 |

(Continued)

OTHER PUBLICATIONS

Liao Canwu, "Hardware Tool Manual", Jiangxi Science and Technology Press, 2004, Version 1, p. 643 (3 pages total).

(Continued)

*Primary Examiner* — Kristina M Deherrera
*Assistant Examiner* — Tania Courson
(74) *Attorney, Agent, or Firm* — Sughrue Mion, PLLC

(57) ABSTRACT

A magnetic marker is embedded in a road, and is configured to be detected by a magnetic sensor provided in a vehicle. The magnetic marker is provided with a case accommodating a magnet and a protective material covering the magnet, and an anchor that is provided protruding downward from the case and that is configured to expand in diameter in a state of being embedded in the road.

5 Claims, 6 Drawing Sheets

(56) References Cited

U.S. PATENT DOCUMENTS

| | | | | | |
|---|---|---|---|---|---|
| 5,263,803 | A | * | 11/1993 | Anquetin | F16B 13/00 411/65 |
| 6,336,064 | B1 | * | 1/2002 | Honkura | G01C 21/26 180/167 |
| 10,801,170 | B2 | * | 10/2020 | Yamamoto | E01F 11/00 |
| 11,238,328 | B2 | * | 2/2022 | Yamamoto | G06K 19/08 |
| 11,294,090 | B2 | * | 4/2022 | Yamamoto | G08G 1/167 |
| 2006/0137913 | A1 | * | 6/2006 | Dicko | G01L 1/14 177/1 |
| 2009/0123251 | A1 | * | 5/2009 | Dubon | F16B 19/125 411/20 |
| 2019/0194886 | A1 | | 6/2019 | Yamamoto et al. | |
| 2019/0390420 | A1 | * | 12/2019 | Smart | F21S 9/037 |

FOREIGN PATENT DOCUMENTS

| | | |
|---|---|---|
| JP | 56-166180 U | 12/1981 |
| JP | 2000-215391 A | 8/2000 |
| JP | 2000-215392 A | 8/2000 |
| JP | 2006-274722 A | 10/2006 |
| JP | 2016-037746 A | 3/2016 |
| JP | 2017-224236 A | 12/2017 |

OTHER PUBLICATIONS

Partial English Translation of Communication dated Mar. 22, 2024, issued in Chinese Application No. 202210344219.8.

* cited by examiner

MAGNETIC MARKER, EMBEDDING JIG FOR MAGNETIC MARKER, AND EMBEDDING METHOD FOR MAGNETIC MARKER

CROSS-REFERENCE TO RELATED APPLICATION

This application claims priority to Japanese Patent Application No. 2021-064108 filed on Apr. 5, 2021, incorporated herein by reference in its entirety.

BACKGROUND

1. Technical Field

The disclosure relates to a magnetic marker that is embedded in a road and used for magnetic guidance of a vehicle, an embedding jig for the magnetic marker and an embedding method for the magnetic marker.

2. Description of Related Art

The magnetic marker is a component that constitutes part of a magnetic vehicle position detection system (hereinafter, Global Magnetic Positioning System (GMPS)). GMPS is a system that estimates a vehicle position by detecting a magnetic marker provided in the road by a magnetic sensor provided in the vehicle, and supports advanced vehicle control such as autonomous driving.

Japanese Unexamined Patent Application Publication No. 2000-215391 (JP 2000-215391 A) discloses a magnetic marker embedded in a road. Generally, when embedding a magnetic marker in a road, work is performed in which a hole is bored in the road, the magnetic marker is embedded in the hole, and a liquid protective material is poured in and hardened, so as to cover the embedded magnetic marker.

SUMMARY

However, the above-described work of embedding the magnetic marker in the road involves time for the liquid protective material to dry and harden, and accordingly the labor time is unnecessarily long.

The disclosure provides a magnetic marker, a magnetic marker embedding jig, and an embedding method for the magnetic marker, whereby the labor time for embedding the magnetic marker can be reduced.

A first aspect of the disclosure relates to a magnetic marker that is configured to be embedded in a road, and is configured to be detected by a magnetic sensor provided in a vehicle. The magnetic marker includes a case that accommodates a magnet and a protective material that covers the magnet, and an anchor that is provided protruding downward from the case, and that is configured to expand in diameter in a state of being embedded in the road.

In the magnetic marker according to this aspect, the anchor may be configured to include a sleeve of which an upper end portion is fixed to the case, and a diameter expander configured to be loosely fitted in the sleeve so as to be movable in an axial direction. A slit may be provided in a lower portion of the sleeve, following the axial direction. A lower portion of the diameter expander may include an enlarged-diameter portion that protrudes from the sleeve and increases in diameter downward. The diameter expander may be configured to be pushed upward by being embedded such that the lower portion of the sleeve is expanded in diameter.

A diameter of the case may be substantially the same as the diameter of the anchor.

A second aspect of the disclosure relates to an embedding jig configured to embed a magnetic marker in a road. The embedding jig may include a base that is configured to be positioned around the magnetic marker inserted into a hole provided in a road surface of the road, and receive the magnetic marker within a bore of the base, and a pusher of which a diameter is larger than an outer diameter of a case and that is configured to be inserted into the bore of the base.

A third aspect of the disclosure relates to an embedding method of embedding a magnetic marker in a road. The embedding method may include boring a hole in the road, driving the magnetic marker into the hole, and expanding a diameter of an anchor by moving a diameter expander upward with respect to a sleeve.

According to the magnetic marker, the embedding jig for the magnetic marker, and the embedding method for the magnetic marker, according to an aspect of the disclosure, the labor time for embedding the magnetic marker can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An example of an embodiment of the disclosure will be described in detail below. In the following description, specific shapes, materials, directions, numerical values, and so forth, are exemplarily described to facilitate understanding of the disclosure, and can be changed as appropriate in accordance with application, purpose, specifications, and so forth.

Figure 1:
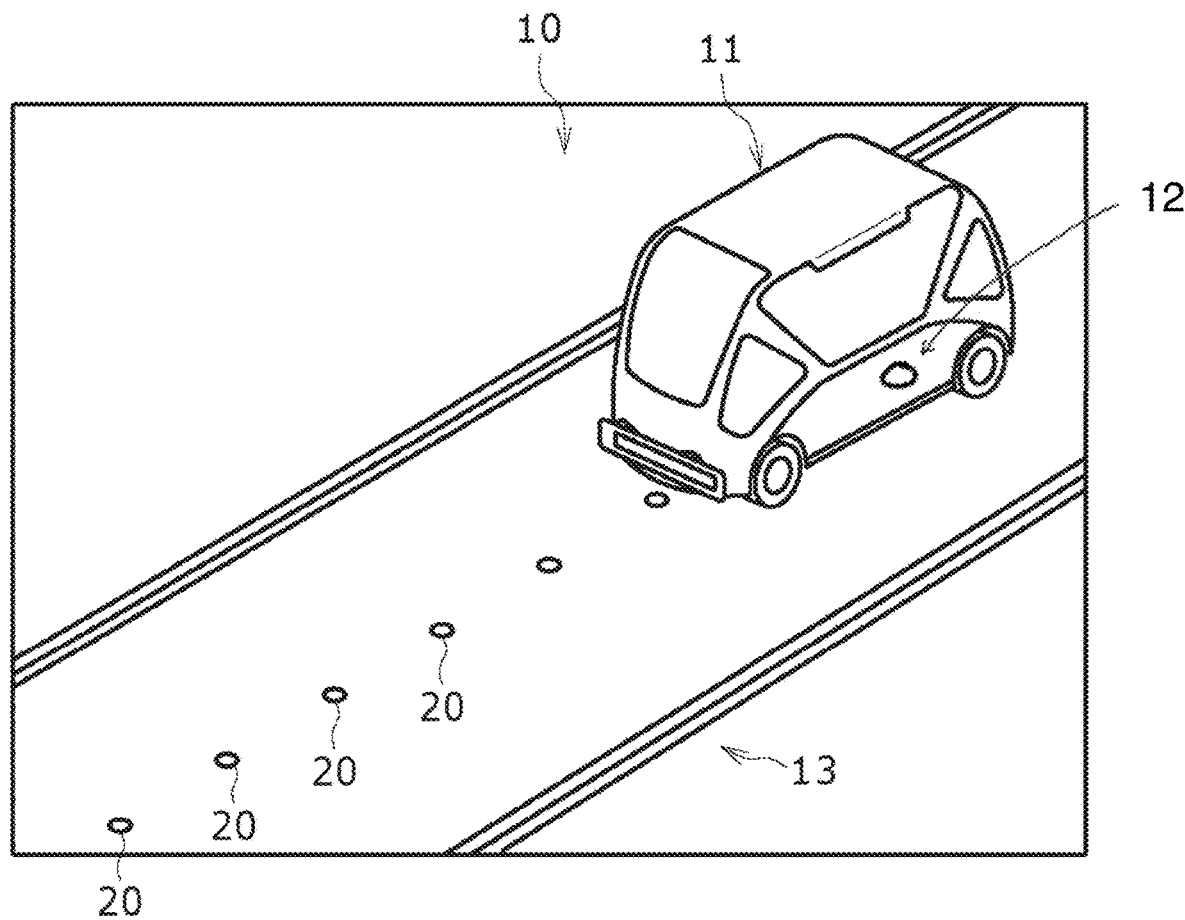
FIG. 1 is a schematic diagram illustrating a magnetic vehicle position detection system according to an embodiment.

A magnetic vehicle position detection system 10 according to the embodiment will be described with reference to FIG. 1. FIG. 1 is a schematic diagram illustrating the magnetic vehicle position detection system 10.

A magnetic marker 20 according to the disclosure is a component that constitutes part of the magnetic vehicle position detection system 10 (hereinafter, Global Magnetic Positioning System (GMPS)), as illustrated in FIG. 1. The GMPS 10 is a system for estimating the position of a vehicle 11 by detecting the magnetic markers 20 provided in a road 13 by a magnetic sensor 12 provided in the vehicle 11 and supporting advanced vehicle control such as autonomous driving.

Figure 2A:
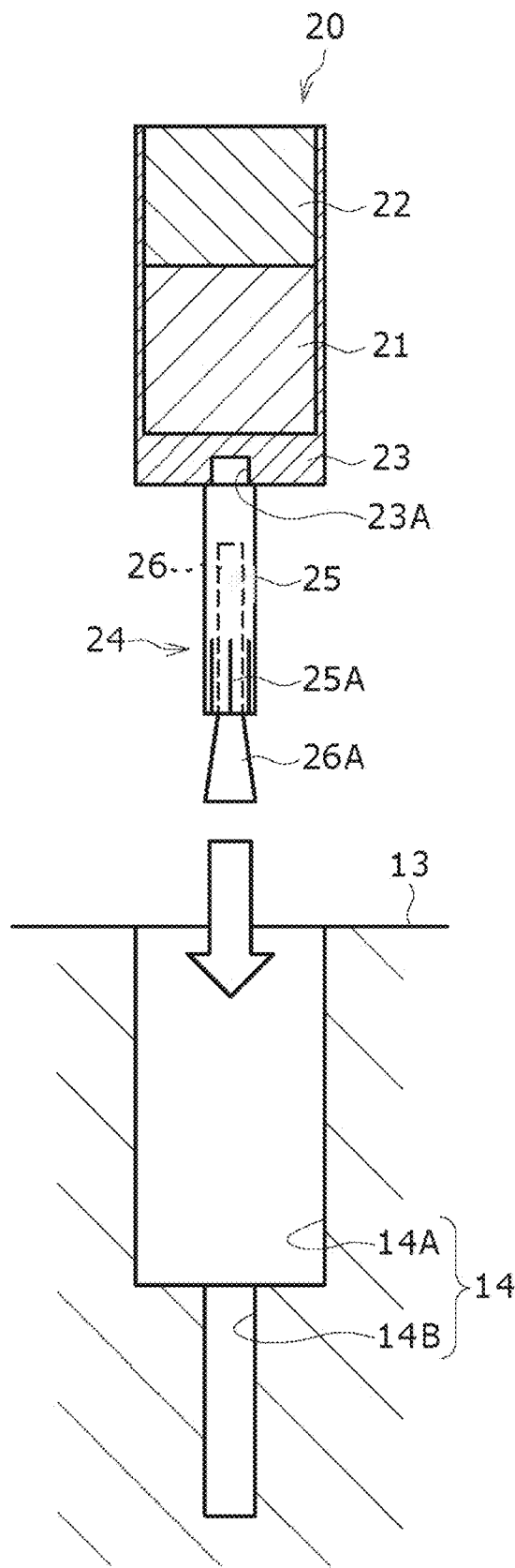
FIG. 2A is a schematic diagram illustrating a magnetic marker that is an example of the embodiment.
Figure 2B:
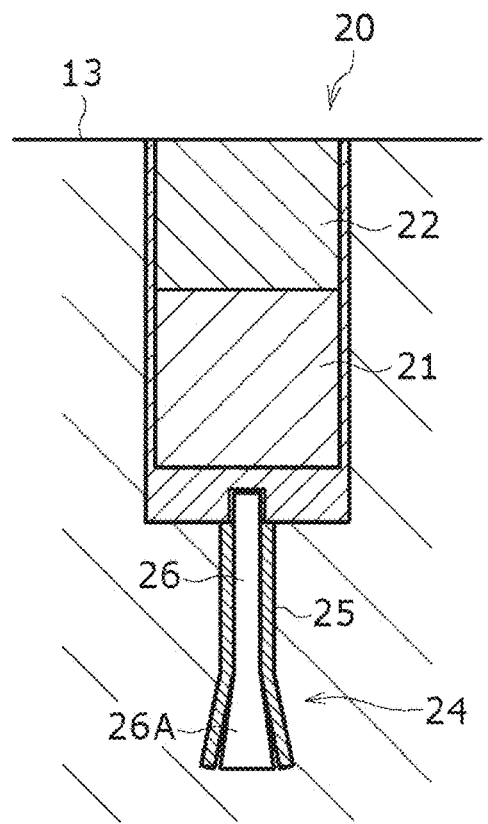
FIG. 2B is a schematic diagram illustrating the magnetic marker that is an example of the embodiment.

The magnetic marker 20 that is an example of the embodiment will be described with reference to FIGS. 2A and 2B. FIGS. 2A and 2B are schematic diagrams illustrating the magnetic marker 20.

The magnetic marker 20 is a component that constitutes part of the above-described GMPS 10, is embedded in the road surface of the road 13, and is detected by the magnetic sensor provided in the vehicle 11.

As illustrated in FIGS. 2A and 2B, the magnetic marker 20 is provided with a case 23 accommodating a magnet 21 and a protective material 22 covering the magnet 21, and an anchor 24 that is provided protruding downward from the case 23 and of which the diameter is expanded in a state of being embedded in the road 13.

The magnetic marker 20 is embedded in a counterbore hole 14 formed in the road surface of the road 13. The counterbore hole 14 includes a large-diameter hole 14A in which the case 23 is embedded, and a small-diameter hole 14B formed below the large-diameter hole 14A into which the anchor 24 is inserted. The counterbore hole 14 is bored by a counterbore drill.

The magnet 21 generates a magnetic force that can be detected by the magnetic sensor provided in the vehicle 11. The magnet 21 is formed in a cylindrical shape, and an isotropic ferrite plastic magnet or a ferrite rubber magnet, in which magnetic powder of iron oxide that is a magnetic material is dispersed in a polymer material (non-conductive material) serving as a base material, is suitably used.

The protective material 22 covers the magnet 21, and protects the magnet 21 from direct sunlight, rainwater, pressure and vibrations due to passage of vehicles, friction during brake operations, road salts spread in the winter season, wear by tire chains, and so forth, on the road surface of the road 13. In this example, a cylindrical resin body having a diameter substantially the same as the diameter of the magnet 21 is suitably used as the protective material 22. The protective material 22 may be in a solid state, and may be adhered and fixed to the magnet 21 and the case 23 by an adhesive. Alternatively, the protective material 22 may be in a liquid state and may be poured into the case 23 accommodating the magnet 21, and thereafter hardened so as to be in a solid state, thus fixing the magnet 21.

The case 23 accommodates the magnet 21 and the protective material 22. According to the case 23, the magnet 21 can be covered by the protective material 22 before the magnet 21 is embedded in the road 13. Thus, when the protective material 22 in a liquid state is hardened and used, the case 23 can be embedded in the road 13 after the protective material 22 is hardened in the case 23. As a result, the time for embedding the magnetic marker 20 in the road 13 can be reduced.

Further, the case 23 can be filled with the protective material 22 in a factory or the like, and accordingly the filling amount of the protective material 22, forming the upper face of the protective material 22 to be flat, and so forth, can be centrally managed. Thus, the quality of the protective material 22 can be improved.

Further, when the protective material 22 is used in a solid state, the protective material 22 can be fixed to the case 23 in a factory or the like, and accordingly gaps between the protective material 22 and the case 23, force of adhesion between the protective material 22 and the case 23, forming the upper face of the protective material 22 so as to be flat, and so forth, can be centrally managed. Thus, the quality of the protective material 22 can be improved.

The case 23 is configured in a cylindrical shape in which the bottom face is closed and the top face is opened. The case 23 is preferably made of a non-magnetic material. The anchor 24 that protrudes downward is fixed to the bottom face of the case 23. A recess 23A that opens downward is provided in the bottom face of the case 23, and an upper end of a diameter expander 26 can be received when the upper end of the diameter expander 26 rises in a sleeve 25. The recess 23A is a portion in which the later-described diameter expander 26 is retracted, in a state in which a later-described sleeve 25 is expanded in diameter when the magnetic marker 20 is embedded in the counterbore hole 14. The length of the case 23 is the same as the length of the large diameter hole 14A of the counterbore hole 14. The outer diameter of the case 23 is the same as the diameter of the large diameter hole 14A of the counterbore hole 14.

The diameter of the anchor 24 is expanded in a state in which the magnetic marker 20 is embedded in the counterbore hole 14. More specifically, the magnetic marker 20 is inserted into the counterbore hole 14, the diameter expander 26 reaches the bottom of the small diameter hole 14B of the counterbore hole 14, and the magnetic marker 20 is further driven down such that the diameter expander 26 moves upward with respect to the sleeve 25, thereby expanding the diameter of the lower portion of the sleeve 25, and thus the anchor 24 is retained in the counterbore hole 14.

According to the anchor 24, the magnetic marker 20 can be firmly fixed by driving the magnetic marker 20 into the counterbore hole 14 bored in the road 13, which will be described in detail later. As a result, workers having skills of driving normal anchors can easily embed the magnetic marker 20 in the road 13.

The anchor 24 is configured in a substantially cylindrical shape that has a diameter smaller than the diameter of the case 23. The anchor 24 has the sleeve 25 that is cylindrical, and the diameter expander 26 that is slender and is loosely fitted in the sleeve 25 so as to be movable in the axial direction.

The upper end portion of the sleeve 25 is fixed to the bottom face of the case 23. Slits 25A are formed in a lower portion of the sleeve 25, following the axial direction. The length of the sleeve 25 is the same as the length of the small diameter hole 14B of the counterbore hole 14. Also, the outer diameter of the sleeve 25 is the same as the diameter of the small diameter hole 14B.

An enlarged-diameter portion 26A that increases in diameter downward is provided at the lower portion of the diameter expander 26. The enlarged-diameter portion 26A of the diameter expander 26 protrudes from the sleeve 25 in the state before embedding in FIG. 2A. The largest diameter of the enlarged-diameter portion 26A is the same as the outer diameter of the sleeve 25 and the diameter of the small diameter hole 14B. Thus, when the sleeve 25 is inserted into the small diameter hole 14B, the enlarged-diameter portion 26A does not interfere with the insertion. The diameter expander 26 is retracted into the recess 23A of the case 23 by moving upward with respect to the sleeve 25, and the diameter of the sleeve 25 is expanded by the thickness of the cylinder of the sleeve 25.

Figure 3:
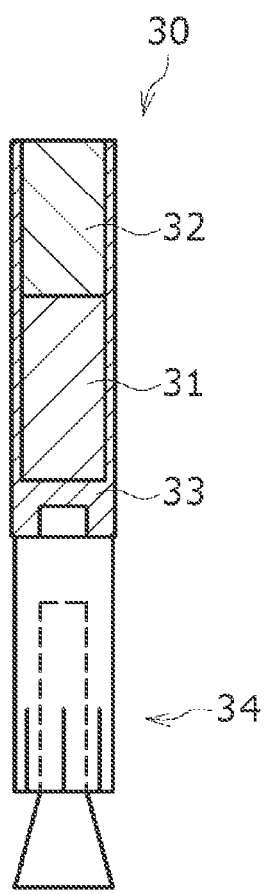
FIG. 3 is a schematic diagram illustrating a magnetic marker that is another example of the embodiment.

A magnetic marker 30 that is another example of the embodiment will be described with reference to FIG. 3. FIG. 3 is a schematic diagram illustrating the magnetic marker 30.

The magnetic marker 30 is configured such that the diameter of a cylindrical case 33 and the diameter of a cylindrical anchor 34 are substantially the same. In this example, the diameters of a magnet 31, a protective material 32, and the case 33, of the magnetic marker 30, are smaller than the diameter of the magnetic marker 20 described above.

According to the magnetic marker 30, in a later-described embedding method of the magnetic marker 30, there is no need to drill the counterbore hole 14 in the road surface of the road 13 using a counterbore drill, and the magnetic marker 30 can be embedded simply by boring a hole with a normal drill. This enables work efficiency of embedding the magnetic marker 30 to be improved.

Figure 4:
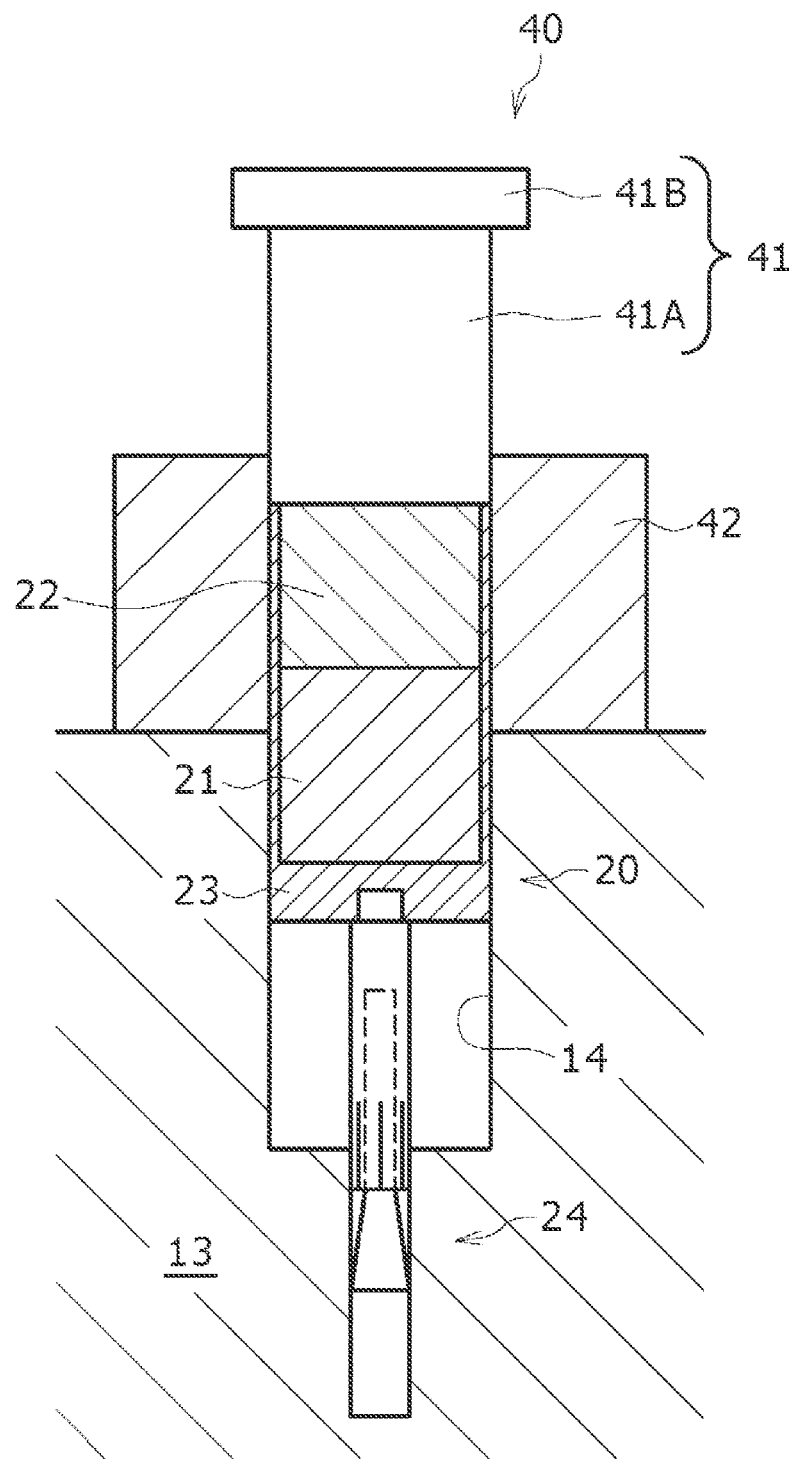
FIG. 4 is a schematic diagram illustrating an embedding jig for the magnetic marker that is an example of the embodiment.
Figure 5:
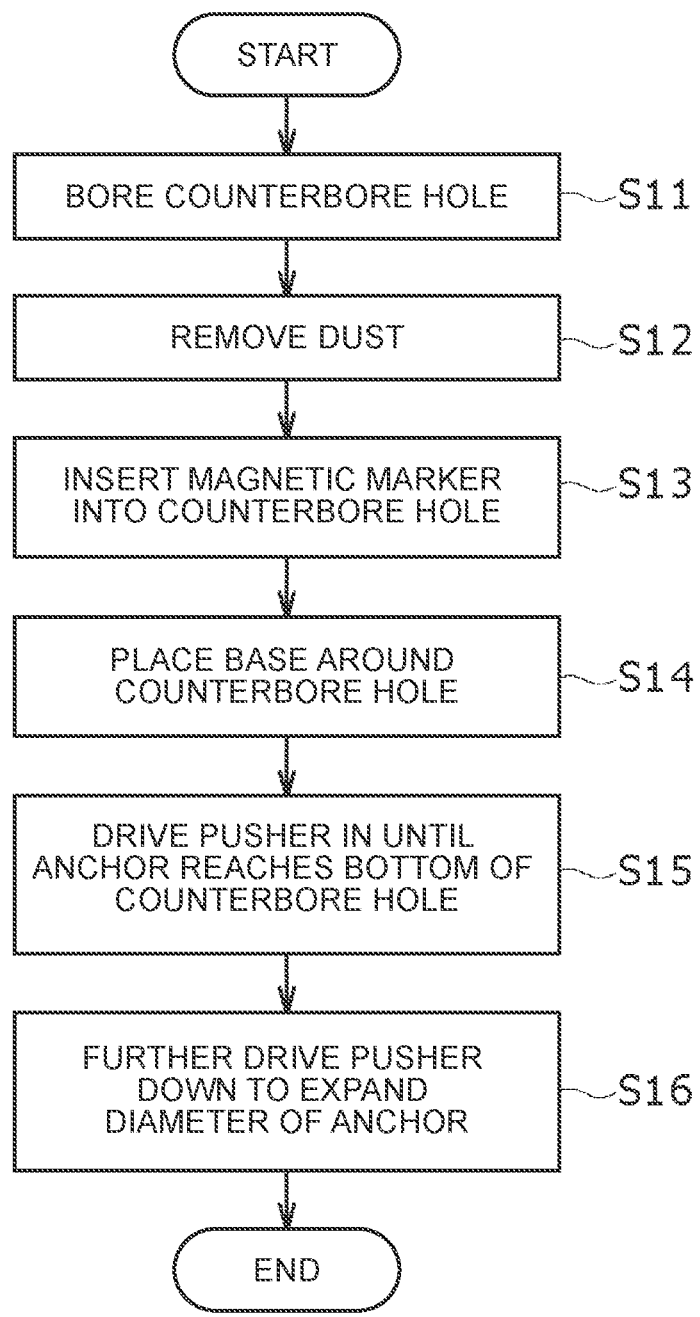
FIG. 5 is a flowchart showing a flow of an embedding process of the magnetic marker that is an example of the embodiment.

An embedding jig 40 for the magnetic marker 20 that is an example of the embodiment will be described with reference to FIG. 4. FIG. 4 is a schematic diagram illustrating the embedding jig 40.

The embedding jig 40 is used for driving the magnetic marker 20 into the counterbore hole 14 bored in the road 13 in the embedding process of the magnetic marker 20, which will be described in detail later. According to the embedding jig 40, the upper face of the magnetic marker 20 (the upper face of the protective material 22) and the road surface of the road 13 can be made to be flush, which will be described in detail later.

The embedding jig 40 includes a pusher 41 having a diameter larger than the inner diameter of the case 23 of the magnetic marker 20, and a base 42 through which the pusher 41 passes.

The pusher 41 has a main body 41A that is made of metal and is columnar in shape, having a diameter slightly larger than the outer diameter of the case 23 of the magnetic marker 20, and a flange portion 41B that is made of metal and is disc-like in shape, having a diameter larger than the outer diameter of the main body 41A. The main body 41A may have a cylindrical shape having a thickness greater than the thickness of the case 23 of the magnetic marker 20.

When the magnetic marker 20 is driven into the counterbore hole 14 by a hammer or the like, for example, the pusher 41 serves as a cushioning material between the hammer and the magnetic marker 20, and the protective material 22 of the magnetic marker 20 is not damaged.

The base 42 is configured in a metal donut shape having an inner diameter slightly larger than the diameter of the main body 41A of the pusher 41. The height of the base 42 is preferably substantially the same as the height of the main body 41A of the pusher 41.

According to the base 42, the upper face of the magnetic marker 20 (the upper face of the protective material 22) and the road surface of the road 13 can be made to be flush by driving the pusher 41 until the flange portion 41B of the pusher 41 abuts the upper face of the base 42. Also, according to the base 42, the pusher 41 is guided in the vertical direction, and accordingly the magnetic marker 20 can be driven into the counterbore hole 14 in the vertical direction.

The embedding process of the magnetic marker 20 that is an example of the embodiment will be described with reference to FIGS. 5 and 6A to 6C.

In the embedding process of the magnetic marker 20 that is an embedding method of the magnetic marker 20, the above-described magnetic marker 20 is embedded using the above-described embedding jig 40.

In step S11, the counterbore hole 14 composed of the large-diameter hole 14A and the small-diameter hole 14B is bored by a counterbore drill at a position on the road 13 at which the magnetic marker 20 is to be embedded (see FIG. 6A), as described above. Note that as described above, in an arrangement in which the magnetic marker 30 is configured having substantially the same diameter of the case 33 and the diameter of the anchor 34, simply boring a hole with a normal drill is sufficient.

In step S12, any dust in the counterbore hole 14 is removed using a dust collector or a dust pump. In step S13, the magnetic marker 20 is inserted into the counterbore hole 14. In step S14, the base 42 of the embedding jig 40 is placed around the counterbore hole 14 and the magnetic marker 20, and the pusher 41 of the embedding jig 40 is inserted into the base 42.

Figure 6A:
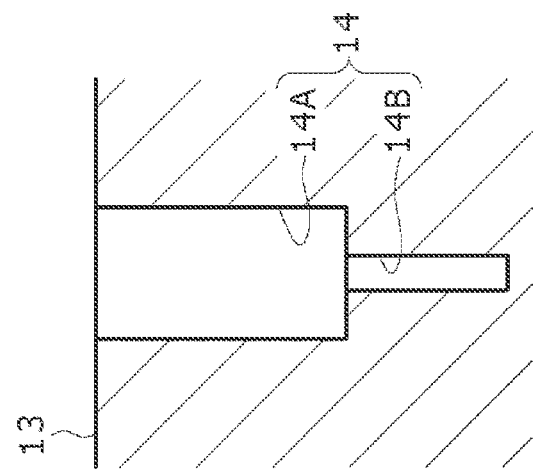
FIG. 6A is a schematic diagram illustrating the flow of the embedding process of the magnetic marker that is an example of the embodiment.
Figure 6B:
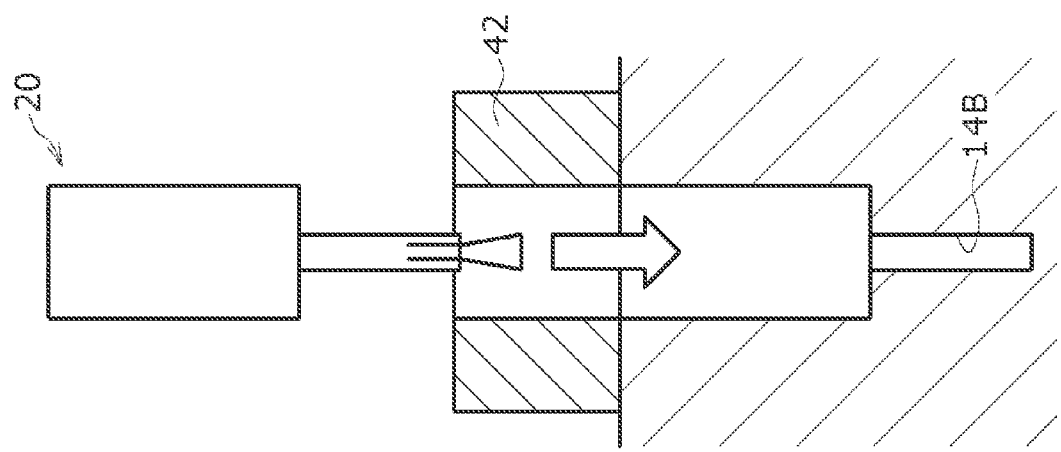
FIG. 6B is a schematic diagram illustrating the flow of the embedding process of the magnetic marker that is an example of the embodiment.

In step S15, the pusher 41 of the embedding jig 40 is struck with a hammer or the like, until the lower end portion of the diameter expander 26 of the anchor 24 of the magnetic marker 20 reaches the bottom of the small diameter hole 14B (see FIG. 6B).

Figure 6C:
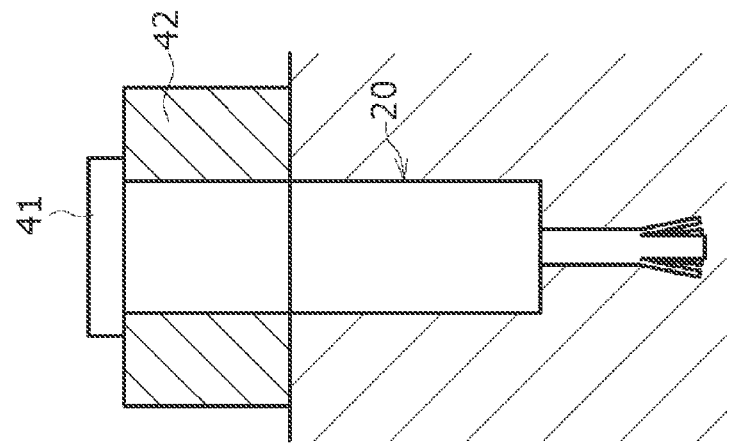
FIG. 6C is a schematic diagram illustrating the flow of the embedding process of the magnetic marker that is an example of the embodiment.

In step S16, the pusher 41 is further struck with a hammer or the like, the upper end portion of the diameter expander 26 of the anchor 24 is retracted into the recess 23A of the case 23, and the diameter of the lower portion of the sleeve 25 of the anchor 24 is expanded by the enlarged-diameter portion 26A of the diameter expander 26, whereby the anchor 24 is firmly fixed to the small diameter hole 14B (see FIG. 6C).

It should be noted that the disclosure is not limited to the above-described embodiment and modifications thereof, and it goes without saying that various changes and improvements can be made within the scope of the matters described in the claims of the present application.

What is claimed is:

1. An embedding jig configured to embed a magnetic marker in a road, wherein the magnetic marker is configured to be detected by a magnetic sensor provided in a vehicle, the magnetic marker comprising:
    a case that accommodates a magnet and a protective material that covers the magnet and has a recess that opens downward in a bottom face of the case; and
    an anchor that is provided protruding downward from the case, and that is configured to expand in diameter in a state of being embedded in the road, wherein:
    the anchor includes a sleeve of which an upper end portion is fixed to the case, and a diameter expander in the sleeve is movable in an axial direction with respect to the sleeve;
    a slit is provided in a lower portion of the sleeve along the axial direction;
    a lower portion of the diameter expander includes an enlarged-diameter portion, wherein the lower portion increases in diameter so as to be tapered outward in the axial direction along a downward direction toward a bottom of the diameter expander,
    in a state before the magnetic marker is embedded in the road, a largest outer diameter of the enlarged-diameter portion is equal to an outer diameter of the sleeve, and the enlarged-diameter portion protrudes axially downward from the sleeve,
    in a state of being embedded, the diameter expander is configured to be pushed upward in the axial direction with respect to the sleeve such that the lower portion of the sleeve is expanded in diameter as the diameter expander pushes upward; and the recess is configured to receive an upper end of the diameter expander when the upper end of the diameter expander rises in the sleeve, the embedding jig comprising:

a base that is configured to be positioned around the magnetic marker inserted into a hole provided in a road surface of the road, and receive the magnetic marker within a bore of the base; and a pusher of which a diameter is larger than an outer diameter of the case and that is configured to be inserted into the bore of the base.

2. The magnetic marker according to claim 1, wherein a diameter of the case is substantially a same as the diameter of the anchor.

3. The embedding jig according to claim 1, wherein, when the embedding jig embeds the magnetic marker into the road, the upper portion of the diameter expander retracts into the recess of the case by moving upward with respect to the sleeve, and the outer diameter of the sleeve is expanded by a thickness of a cylinder of the sleeve.

4. An embedding method of embedding the magnetic marker in the road using the embedding jig according to claim 1, the embedding method comprising:

boring a hole in the road;

striking the embedding jig with a hammer so as to drive the magnetic marker axially into the hole until a lower end portion of the diameter expander reaches a bottom of the hole thereby causing the diameter of the anchor to expand outward as the diameter expander moves upward with respect to the sleeve.

5. The embedding method according to claim 4, wherein the pusher includes a main body and a flange portion, wherein the diameter of the pusher is equal to a diameter of the main body, which is larger than the outer diameter of the case, and the flange portion has a disc shape having a diameter larger than the diameter of the main body, wherein the pusher serves as a cushioning material between the hammer and the magnetic marker so that the magnetic marker is axially driven into the road by striking the hammer against the flange portion of the pusher.

* * * * *